(12) United States Patent
Okura et al.

(10) Patent No.: US 11,859,736 B2
(45) Date of Patent: Jan. 2, 2024

(54) ANTISTATIC FLEXIBLE HOSE

(71) Applicant: TOYOX CO., LTD., Toyama (JP)

(72) Inventors: Masaru Okura, Toyama (JP); Kenichi Numata, Toyama (JP)

(73) Assignee: TOYOX CO., LTD., Toyama (JP)

( * ) Notice: Subject to any disclaimer, the term of this patent is extended or adjusted under 35 U.S.C. 154(b) by 331 days.

(21) Appl. No.: 17/601,573

(22) PCT Filed: Apr. 10, 2020

(86) PCT No.: PCT/JP2020/016074
§ 371 (c)(1),
(2) Date: Oct. 5, 2021

(87) PCT Pub. No.: WO2020/209352
PCT Pub. Date: Oct. 15, 2020

(65) Prior Publication Data
US 2022/0205563 A1  Jun. 30, 2022

(30) Foreign Application Priority Data

Apr. 12, 2019 (JP) ................................. 2019-076093

(51) Int. Cl.
*F16L 11/118* (2006.01)
*F16L 11/112* (2006.01)
(Continued)

(52) U.S. Cl.
CPC ......... *F16L 11/1185* (2013.01); *F16L 11/112* (2013.01); *F16L 11/127* (2013.01)

(58) Field of Classification Search
CPC .. F16L 11/04; F16L 11/12; F16L 11/10; F16L 11/127; F16L 11/112;
(Continued)

(56) References Cited

U.S. PATENT DOCUMENTS 3,963,856 A  6/1976 Carlson et al.
4,870,535 A * 9/1989 Matsumoto ............ B65G 53/52
138/122

(Continued)

FOREIGN PATENT DOCUMENTS

FR  2 911 381      7/2008
JP  S51-76622 A    7/1976
(Continued)

OTHER PUBLICATIONS

Extended European Search Report, in counterpart EP Patent Application No. 20787505.5, dated Nov. 14, 2022 (in English).
(Continued)

*Primary Examiner* — Hoa C Nguyen
*Assistant Examiner* — Amol H Patel
(74) *Attorney, Agent, or Firm* — Greenblum & Bernstein, P.L.C.

(57) ABSTRACT

An antistatic flexible hose, including: a hose body which is formed of a soft material having flexibility; a conductive layer which is provided along an outer peripheral face of the hose body in an axial direction; a conductive wire which is wound in a spiral shape along the outer peripheral face of the hose body and an outer surface of the conductive layer and which is provided so as to be pressure-welded, in a radial direction, to the outer peripheral face of the hose body and the outer surface of the conductive layer; and a reinforcing member which is provided in a spiral shape along the conductive wire so as to protrude from the outer peripheral face of the hose body and the outer surface of the conductive layer.

2 Claims, 3 Drawing Sheets

(51) Int. Cl.
*F16L 11/127* (2006.01)
*F16L 11/10* (2006.01)

(58) Field of Classification Search
CPC .......... F16L 11/1185; H01B 7/17; H01B 7/18; H01B 7/184; H01B 7/226
See application file for complete search history.

(56) References Cited

U.S. PATENT DOCUMENTS

| | | | | |
|---|---|---|---|---|
| 5,416,270 | A * | 5/1995 | Kanao | F16L 11/1185 174/114 R |
| 6,671,162 | B1 * | 12/2003 | Crouse | F16L 11/127 138/125 |
| 8,563,863 | B2 | 10/2013 | Carlson | |
| 9,322,501 | B1 | 4/2016 | Carlson | |
| 2004/0108011 | A1 | 6/2004 | Eck et al. | |
| 2010/0089479 | A1 * | 4/2010 | Smith | F16L 11/16 138/119 |
| 2011/0168287 | A1 * | 7/2011 | Carlson | B29C 53/78 138/108 |
| 2011/0192624 | A1 * | 8/2011 | Carlson | F16L 11/16 174/34 |
| 2014/0037276 | A1 | 2/2014 | Carlson | |
| 2014/0053939 | A1 * | 2/2014 | Kaye | F16L 11/112 138/109 |
| 2014/0366979 | A1 * | 12/2014 | Mollen | F16L 11/127 138/137 |
| 2017/0248255 | A1 * | 8/2017 | Mollen | H01B 3/47 |
| 2019/0011064 | A1 * | 1/2019 | Berezin | F16L 9/006 |
| 2019/0195398 | A1 * | 6/2019 | Nüssen | F16L 11/1185 |
| 2019/0264840 | A1 * | 8/2019 | Nüssen | B29C 53/785 |
| 2020/0080667 | A1 * | 3/2020 | Miller | F16L 11/005 |

FOREIGN PATENT DOCUMENTS

| | | |
|---|---|---|
| JP | S54-042010 U | 3/1979 |
| JP | S63-177377 U | 11/1988 |
| JP | 2000-65257 A | 3/2000 |
| JP | 3690790 | 6/2005 |
| JP | 2010-144808 A | 7/2010 |
| JP | 5326072 | 10/2013 |
| JP | 5368861 B2 | 12/2013 |
| KR | 10-1965772 B1 | 4/2019 |
| WO | 2012/128736 | 9/2012 |
| WO | 2017/141901 A1 | 8/2017 |

OTHER PUBLICATIONS

International Search Report issued in WIPO Application No. PCT/JP2020/016074, dated Jun. 30, 2020, English translation.
Written Opinion issued in WIPO Application No. PCT/JP2020/016074, dated Jun. 30, 2020.
International Preliminary Report on Patentability issued in WIPO Application No. PCT/JP2020/016074, dated Sep. 28, 2021, English translation.
First Examination Report, India Patent Office, in counterpart Indian Patent Application No. 202117048036, dated Sep. 19, 2022, with English translation.
Office Action issued in the corresponding EP patent application No. 20787505.5, dated Oct. 5, 2023.
Office Action, Indonesia Patent Office, in counterpart Indonesian Patent Application No. P00202108318, dated Oct. 11, 2022, with English translation.

* cited by examiner

ANTISTATIC FLEXIBLE HOSE

TECHNICAL FIELD

The present invention relates to an antistatic flexible hose with superior static electricity-removal performance in a hose, a tube, or the like which is used in manufacturing facilities in the food and beverage industries, the chemical industry including medical supplies, the semiconductor industry, the cosmetics industry, the perfume industry, and the like.

BACKGROUND ART

Conventionally, as an antistatic flexible hose of this type, there is an antistatic resin hose in which a spiral conductive wire is interposed along an entire length of an outer peripheral face of an inner layer hose between the inner layer hose and an outer layer hose, and an inner face of a conductive resin layer which has been integrally molded as a part of the outer layer hose and which extends in a length direction is crimped to each winding portion of the conductive wire which traverses the conductive resin layer at a predetermined interval (for example, refer to PTL 1).

A synthetic resin material for molding the inner layer hose and the outer layer hose is arbitrarily selected and used from various synthetic resins or the like or elastomers thereof.

Performing integral molding by crimping the outer layer hose to the outer peripheral face of the inner layer hose by extrusion molding causes the inner face of the linear conductive resin layer to be respectively crimped by each winding of the conductive wire that traverses the conductive resin layer at a constant pitch of the spiral conductive wire and enables a strong electric connection to be obtained (refer to paragraph [0013], FIG. 2).

CITATION LIST

Patent Literature

[PTL 1] Japanese Patent No. 5368861

SUMMARY OF INVENTION

Technical Problem

When a part in an axial direction of a flexible hose such as a hose or a tube is bent during use such as when being connected to a pipe in a factory or the like, in the bent part, a part on the outside in the bending direction extends in the axial direction and, at the same time, a clearance wall is created in a part on the inside in the bending direction to enable the bent part to inflect smoothly.

However, with a laminated structure of an inner layer hose and an outer layer hose made of a synthetic resin or an elastomer as described in PTL 1, a slight difference between component materials of the inner layer hose and the outer layer hose may create a difference in elongation amounts between the inner layer hose and the outer layer hose. In other words, when rates of elongation differ between the inner layer hose and the outer layer hose, there is a concern that peeling and separation may occur between layers as the inner layer hose and the outer layer hose partially separate from each other due to the bending of the hose.

Since PTL 1 provides a structure in which a spiral conductive wire that is wound along the outer peripheral face of the inner layer hose and an inner face of a conductive resin layer that is integrally molded as a part of the outer layer hose are brought into contact with each other, there is a problem in that contact resistance between the conductive wire and the conductive resin layer increases due to a partial separation (inter-layer peeling and separation) of the inner layer hose and the outer layer hose due to the bending of the hose.

Furthermore, since the conductive resin layer is disposed exposed on the outer peripheral face of the outer layer hose, the conductive resin layer may readily become cracked and sustain damage, e.g., peeling and separation, due to a vibration, an impact, or the like received by being in contact with a grounding face or the like. Fragments of the damaged, peeled, or separated conductive resin layer become foreign objects which are particularly unsuitable in the food and beverage industries, the medical industry, and the like where strict regulations are imposed on contamination by such foreign substances.

Solution to Problem

In order to solve the problem described above, an antistatic flexible hose according to the present invention includes: a hose body which is formed of a soft material having flexibility; a conductive layer which is provided along an outer peripheral face of the hose body in an axial direction; a conductive wire which is wound in a spiral shape along the outer peripheral face of the hose body and an outer surface of the conductive layer and which is provided so as to be pressure-welded, in a radial direction, to the outer peripheral face of the hose body and the outer surface of the conductive layer; and a reinforcing member which is provided in a spiral shape along the conductive wire so as to protrude from the outer peripheral face of the hose body and the outer surface of the conductive layer, wherein the reinforcing member is disposed so as to sandwich the conductive wire between the reinforcing member and the outer surface of the conductive layer so that a surface of the conductive wire is crimped to the outer surface of the conductive layer.

BRIEF DESCRIPTION OF DRAWINGS

FIGS. 1(a) and 1(b) are explanatory diagrams showing an overall configuration of an antistatic flexible hose according to an embodiment (a first embodiment) of the present invention, in which FIG. 1(a) is a partially-notched front view and FIG. 1(b) is a perspective view cut away in stages.

FIGS. 2(a) and 2(b) are explanatory diagrams showing a modification (a second embodiment) of the antistatic flexible hose according to the embodiment of the present invention, in which FIG. 2(a) is a partially-notched front view and FIG. 2(b) is a perspective view cut away in stages.

FIGS. 3(a) and 3(b) are explanatory diagrams showing a bent state of the first embodiment, in which FIG. 3(a) is a partially-enlarged longitudinal section view when bent in a state where a conductive layer 2 is disposed on the outside in a bending direction and FIG. 3(b) is a partially-enlarged longitudinal section view when bent in a state where the conductive layer 2 is disposed on the inside in the bending direction.

DESCRIPTION OF EMBODIMENTS

Hereinafter, an embodiment of the present invention will be described in detail with reference to the drawings.

Figure 1:
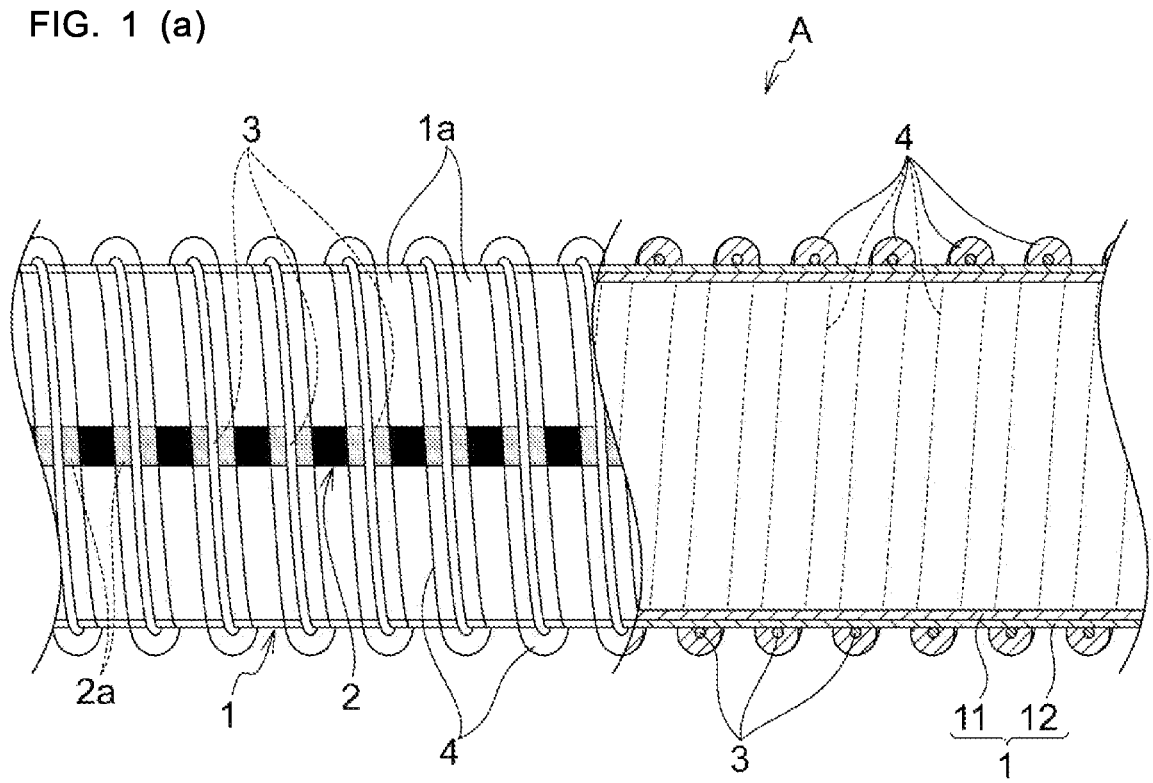
Figure 1:
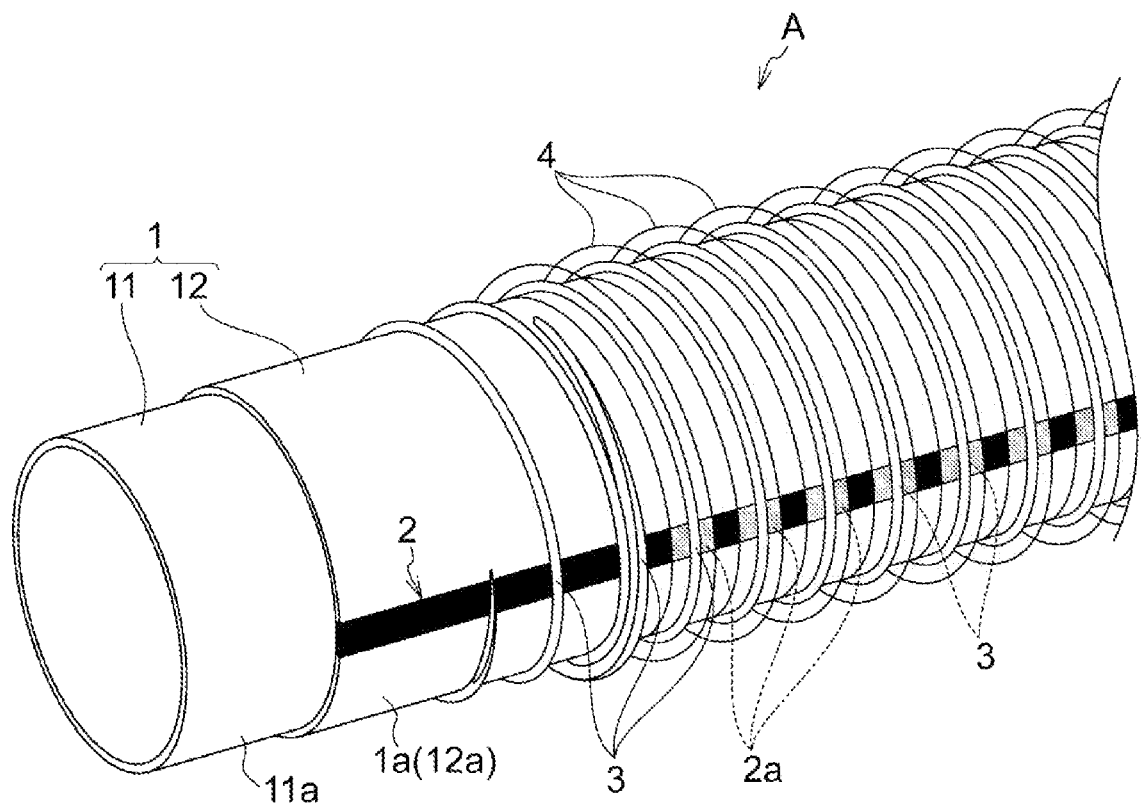
Figure 2:
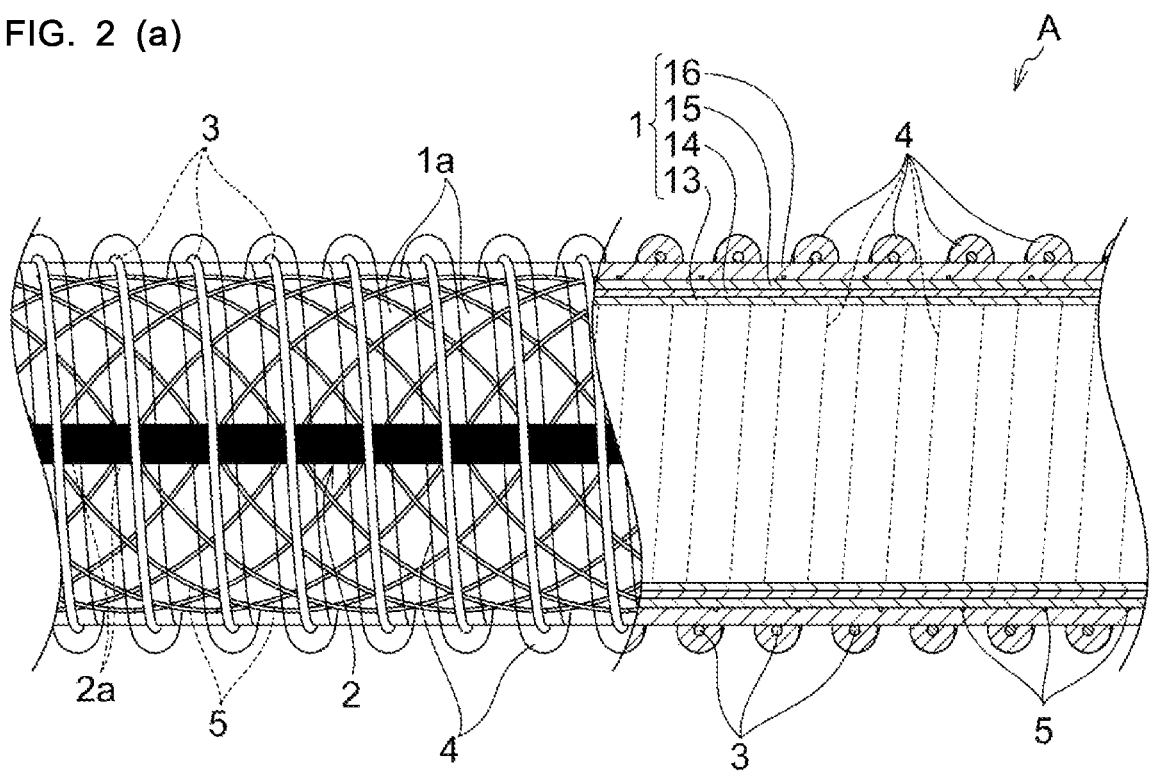
Figure 2:
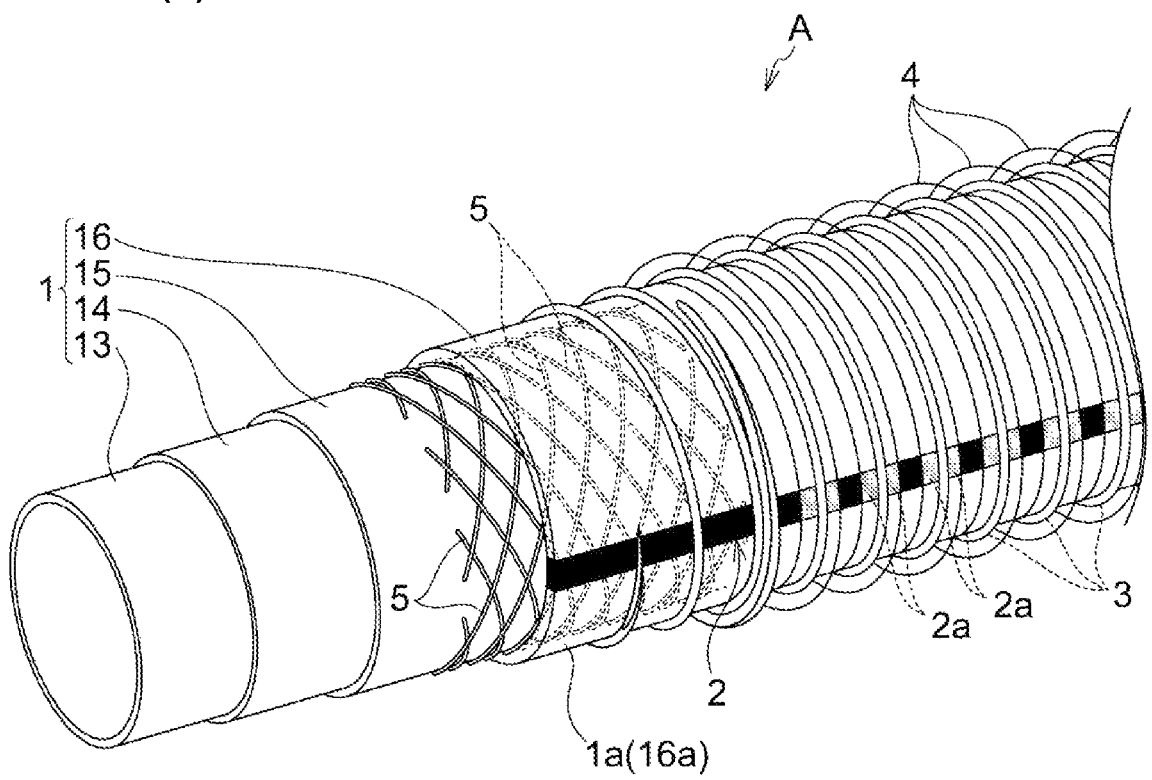
Figure 3:
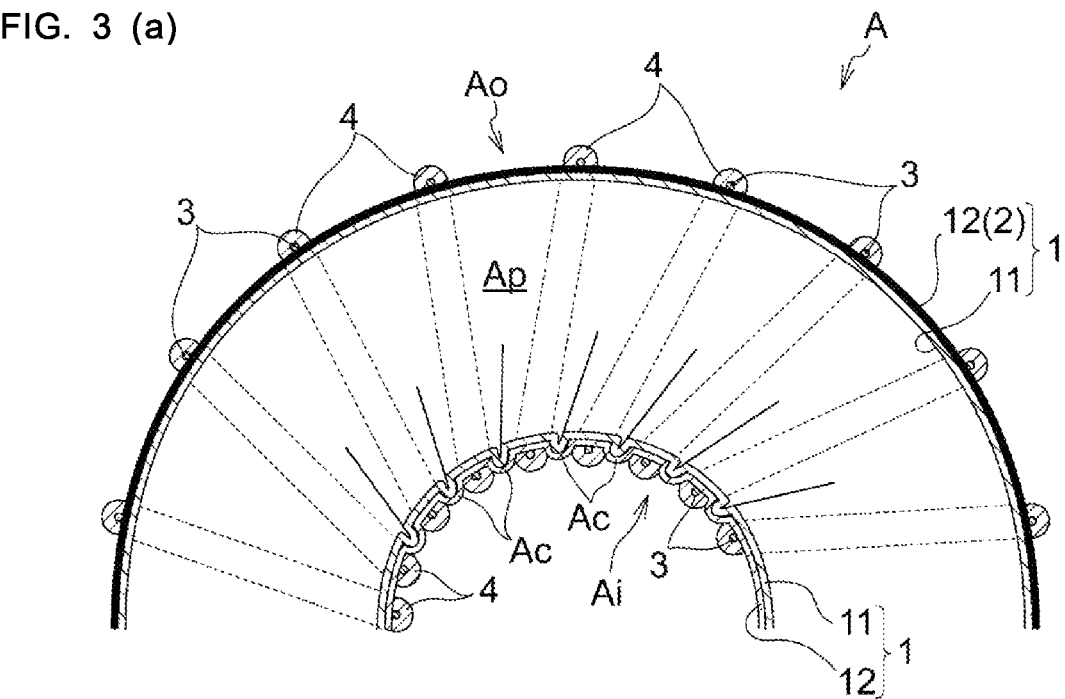
Figure 3:
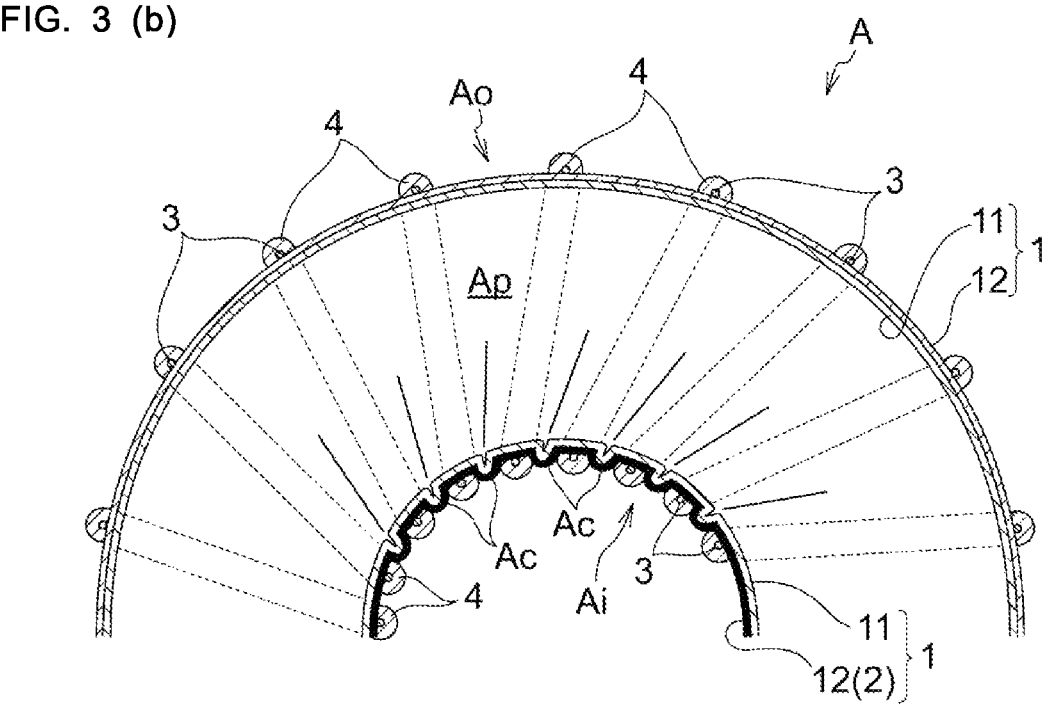

As shown in FIGS. 1 to 3, an antistatic flexible hose A according to the embodiment of the present invention is a hose, a tube, or the like which is used in manufacturing facilities in the food and beverage industries, the chemical industry including medical supplies, the semiconductor industry, the cosmetics industry, the perfume industry, and the like.

In particular, the antistatic flexible hose is a hose, a tube, or the like which not only prevents static buildup by static electricity created by conveyance of a powder, a granule, or the like but also exhibits superior pressure resistance performance.

More specifically, the antistatic flexible hose A according to the embodiment of the present invention includes, as main constituent elements thereof, a hose body 1 having flexibility, a conductive layer 2 provided in an axial direction along an outer peripheral face 1a of the hose body 1, a conductive wire 3 provided in a spiral shape along the outer peripheral face 1a of the hose body 1 and an outer surface 2a of the conductive layer 2, and a reinforcing member 4 provided in a spiral shape along the conductive wire 3.

The hose body 1 is a soft material or a semi-hard material made of a soft synthetic resin or a semi-hard synthetic resin such as vinyl chloride, an elastomer of such a synthetic resin, or other rubbers which is formed in a single layer structure, a plural layer structure, or a multiple layer structure. A single layer structure refers to a structure solely made of a single layer, a plural layer structure refers to a structure in which a plurality of layers are laminated so as to overlap with each other in a radial direction of the hose body 1, and a multiple layer structure refers to a structure in which a large number of layers are laminated in the radial direction of the hose body 1.

As the component material of the hose body 1, a transparent material or a translucent material is preferably used so that a fluid (not illustrated) which flows along an inner flow path Ap of the hose body 1 can be seen through from the outside of the hose body 1.

As a method for manufacturing the hose body 1, layers are preferably created by extrusion molding, coextrusion molding, or the like.

In addition, as shown in FIG. 2, a braided blade 5 may be included between layers of the hose body 1 when necessary. The blade 5 is a reinforcing thread made of a synthetic resin fiber such as polyester, nylon (registered trademark), or aramid and is braided so as to be meshed or knit woven.

The conductive layer 2 having electrical conductivity is formed on the outer peripheral face 1a of the hose body 1 in a part of a circumferential direction of the hose body 1 in a band shape or a linear shape that extends in an axial direction of the hose body 1.

The conductive layer 2 is formed over an entire radial direction of a layer that is exposed on the outer peripheral face 1a in the hose body 1 or formed partially only on the outside in the radial direction of the layer that is exposed on the outer peripheral face 1a in the hose body 1.

Examples of a shape of the conductive layer 2 include a continuous shape that is disposed along an entire axial-direction length of the hose body 1 and an intermittent shape that is disposed at intervals of a predetermined length in the axial direction of the hose body 1.

As an example of disposing the conductive layer 2 on the outer peripheral face 1a of the hose body 1, preferably, a width in the circumferential direction of the hose body 1 is narrowed and a plurality of or only one the conductive layer 2 is formed at predetermined intervals in the circumferential direction so that a fluid in the inner flow path Ap can be sufficiently seen through the transparent or translucent hose body 1.

As a method for manufacturing the conductive layer 2, for example, a conductive material containing highly conductive particulates such as particulates of a carbon material such as carbon black or metallic particulates are preferably extrusion-molded or coextrusion-molded with respect to a synthetic resin that acts as a base.

In addition, as another example of the method for manufacturing the conductive layer 2, the method for manufacturing can be changed to printing a conductive material or fixing a wire made of metal, a conductive thread, a conductive monofilament, or the like.

The conductive wire 3 with a spiral shape is provided outside the hose body 1 and the conductive layer 2 along the outer peripheral face 1a of the hose body 1 and the outer surface 2a of the conductive layer 2.

The conductive wire 3 is formed in a linear shape using a conductive material having electrical conductivity such as a wire made of metal such as stainless steel, a conductive thread, or a conductive monofilament and wound so as to be tightened in the radial direction of the hose body 1 toward the outer peripheral face 1a of the hose body 1 and the outer surface 2a of the conductive layer 2. Accordingly, the conductive wire 3 is attached by winding so as to be pressure-welded in the radial direction of the hose body 1 with respect to the outer peripheral face 1a of the hose body 1 and the outer surface 2a of the conductive layer 2.

As a component material of the conductive wire 3, a metallic wire or the like is preferably used as a hard material with higher rigidity than the component material of the hose body 1.

As a method for manufacturing the conductive wire 3, preferably, the conductive wire 3 is continuously wound and molded in a state where an elastic repulsive force is retained by winding the conductive wire 3 with a predetermined winding tension using a coil molder (not illustrated) or the like with respect to the hose body 1 and the conductive layer 2 having been extrusion-molded or coextrusion-molded.

Furthermore, the reinforcing member 4 with a spiral shape is provided outside the hose body 1 and the conductive layer 2 along the conductive wire 3 so as to protrude from the outer peripheral face 1a of the hose body 1 and the outer surface 2a of the conductive layer 2. Accordingly, the conductive layer 2 is disposed so as to be depressed between the reinforcing member 4 that spirally protrudes from the outer peripheral face 1a of the hose body 1 and the outer surface 2a of the conductive layer 2.

The reinforcing member 4 is formed in a thick line shape that is wider than an outer diameter of the conductive wire 3 using a soft material or a semi-hard material made of a soft synthetic resin, a semi-hard synthetic resin, an elastomer of such a synthetic resin, or other rubbers which has superior compatibility with the component material of the outer peripheral face 1a of the hose body 1 and which is readily adherable.

As the component material of the reinforcing member 4, preferably, a material which is harder than the soft material that constitutes the hose body 1 and which is transparent or translucent is preferably used so that a fluid which flows along the inner flow path Ap of the hose body 1 can be seen through from the outside of the hose body 1 and the reinforcing member 4.

Furthermore, the reinforcing member 4 is disposed so as to sandwich the conductive wire 3 with the outer surface 2a of the conductive layer 2 so that a surface of the conductive wire 3 is crimped to the outer surface 2a of the conductive layer 2.

As a method for manufacturing the reinforcing member 4, preferably, the reinforcing member 4 is laminated so as to overlap with the conductive wire 3 with respect to the hose body 1 and the conductive layer 2 having been continuously molded in the axial direction by extrusion molding or coextrusion molding.

When an example (the first embodiment) of the hose body 1, the conductive layer 2, and the like are as shown in FIGS. 1(a) and 1(b), the conductive layer 2 with a continuous shape is formed over an entire axial-direction length of the hose body 1 with a plural layer structure.

The illustrated hose body 1 has a two-layer structure in which an inner layer 11 which is made of semi-hard vinyl chloride or the like with superior abrasion resistance and of which an entire circumferential direction is transparent and a transparent outer layer 12 made of soft vinyl chloride or the like are laminated in the radial direction. The band-shaped conductive layer 2 is coextrusion-molded in a part in the circumferential direction of the outer layer 12 so as to be disposed exposed to an outer peripheral face 12a of the outer layer 12.

When another example (a second embodiment) of the hose body 1, the conductive layer 2, and the like are as shown in FIGS. 2(a) and 2(b), the conductive layer 2 with a continuous shape is formed over an entire length of the hose body 1 with a multiple layer structure.

The hose body 1 of the illustrated example has a four-layer structure in which an innermost layer 13 made of a fluororesin (ethylene-tetrafluoroethylene copolymer) or the like with superior abrasion resistance, gas permeability, and chemical resistance, an inner layer 14 made of a polyamide-based resin (modified nylon 12) or the like, and an intermediate layer 15 and an outer layer 16 made of a polyurethane-based elastomer (thermoplastic polyurethane) or the like are laminated in a radial direction. The band-shaped conductive layer 2 is coextrusion-molded in a part in the circumferential direction of the outer layer 16 so as to be disposed exposed to an outer peripheral face 16a of the outer layer 16. A meshed blade 5 is provided along an outside surface of the intermediate layer 15 between the intermediate layer 15 and the outer layer 16.

Moreover, although not illustrated, as other modifications, the hose body 1 can be formed in a single layer structure in which the conductive layer 2 is formed over an entire radial direction or only on the outside in the radial direction or the hose body 1 may be changed to a three-layer structure or a structure with five layers or more. In addition, the shape of the conductive layer 2 can be changed to an intermittent shape from a continuous shape, a meshed or knit woven blade 5 can be provided between the inner layer 11 and the outer layer 12 in the first embodiment, or the blade 5 in the second embodiment can be changed to a knit woven blade 5 from the meshed blade 5. When the shape of the conductive layer 2 is changed to an intermittent shape, the conductive layer 2 is disposed so as to straddle between pitches of the conductive wire 3.

Next, a method of use of the antistatic flexible hose A according to the embodiment of the present invention will be described.

As an example of use of the antistatic flexible hose A, preferably, "a hose connection structure in which a hose having a conductive wire exposed on a hose surface is fitted into a grounded metallic pipe, a coil-shaped metallic grounding member is fitted to a connecting part of the metallic pipe and the hose, and the grounding member is brought into contact with the metallic pipe and the conductive wire on the hose surface" described in Japanese Patent No. 3690790 is used.

In other words, in place of the "hose" described in Japanese Patent No. 3690790, an axial direction end part of the antistatic flexible hose A according to the first embodiment or the second embodiment is fitted into a grounded metallic pipe by grounding of a device main body, and a metallic grounding member is attached to a connecting part of the metallic pipe and the axial direction end part of the antistatic flexible hose A and tightened by a coil portion.

Accordingly, the grounding member is kept in a contact state across the outer surface 2a of the conductive layer 2 which is exposed between the spiral reinforcing member 4 on the surface of the antistatic flexible hose A and the metallic pipe, the conductive layer 2 is electrically connected to the metallic pipe via the grounding member, and the antistatic flexible hose A enters a grounded state.

Therefore, static electricity generated in the antistatic flexible hose A is discharged via the conductive wire 3→the conductive layer 2→the grounding member→the metallic pipe→the device main body.

In addition, when the device main body is not grounded, the device main body can be grounded via grounding by attaching the metallic grounding member to any point in the axial direction of the antistatic flexible hose A.

Next, bending of the antistatic flexible hose A according to the embodiment of the present invention will be described.

As shown in FIGS. 3(a) and 3(b), by bending a part in the axial direction of the antistatic flexible hose A, in the bent part, a bending direction outside part Ao extends in the axial direction and, at the same time, a bending direction inside part Ai partially protrudes to create a clearance wall Ac.

Therefore, a part in the axial direction of the antistatic flexible hose A smoothly inflects while preventing a crush deformation of the inner flow path Ap that causes a cross-section thereof to change to an approximately elliptical cross-section and maintaining the circular cross-section shape of the inner flow path Ap. By comparison, in a case of a flexible hose without the reinforcing member 4, although not illustrated, a crush deformation of the inner flow path Ap occurs and causes the cross-section to change to an approximately elliptical cross-section shape with the bending of the flexible hose, thereby increasing the likelihood of clogging of a fluid and causing shape retainability to decline.

In doing so, depending on usage thereof, the conductive layer 2 of the antistatic flexible hose A may be disposed in the bending direction outside part Ao (extension side) in the bent part as shown in FIG. 3(a) or may be disposed in the bending direction inside part Ai (clearance wall side) in the bent part as shown in FIG. 3(b).

The illustrated example represents the first embodiment. Since the second embodiment is similar to the first embodiment, an illustration thereof will be omitted.

As shown in FIG. 3(a), when the conductive layer 2 disposed in the bending direction outside part Ao is extended in the axial direction due to bending, a force is applied so as to separate the conductive layer 2 from the reinforcing member 4 and the conductive wire 3.

However, since the conductive wire 3 is tightened in the radial direction toward the outer surface 2a of the conductive layer 2, a crimping state to the conductive wire 3 is maintained so as to follow the conductive layer 2.

Conversely, as shown in FIG. 3(b), when the conductive layer 2 disposed in the bending direction inside part Ai is caused to partially protrude to create the clearance wall Ac due to bending, a force is applied so as to cause the conductive layer 2 to approach the reinforcing member 4 and the conductive wire 3.

Therefore, a crimping state of the conductive layer 2 and the conductive wire 3 is maintained.

With the antistatic flexible hose A according to the embodiment of the present invention described above, as shown in FIG. 3(a), even when a force is applied so as to separate the conductive layer 2 from the reinforcing member 4 and the conductive wire 3 due to bending of the antistatic flexible hose A, since the conductive wire 3 is tightened in the radial direction toward the outer surface 2a of the conductive layer 2, a crimping state to the conductive wire 3 is maintained so as to follow the conductive layer 2.

Accordingly, a contact resistance of the conductive layer 2 and the conductive wire 3 is kept low independently of a length in the axial direction of the antistatic flexible hose A.

In addition, the conductive layer 2 is disposed so as to be depressed between the reinforcing member 4 that spirally protrudes from the outer peripheral face 1a of the hose body 1 and the outer surface 2a of the conductive layer 2. Therefore, even when the reinforcing member 4 comes into contact with a grounding face or the like, the conductive layer 2 remains contact-free.

Furthermore, even when the conductive wire 3 is covered by the reinforcing member 4 and is not exposed and the reinforcing member 4 comes into contact with a grounding face or the like, the conductive wire 3 remains contact-free.

Therefore, both prevention of an increase in contact resistance of the conductive layer 2 and the conductive wire 3 and prevention of breakage or peeling and separation of the conductive layer 2 and the conductive wire 3 with the bending of the flexible hose can be achieved.

As a result, compared to a conventional configuration in which a spiral conductive wire that is wound along an outer peripheral face of an inner layer hose and an inner face of a conductive resin layer integrally molded to a part of an outer layer hose are brought into contact with each other, an electric resistance value can be lowered and stabilization can be achieved regardless of bending and without following a length of the antistatic flexible hose A.

In addition, compared to a conventional configuration in which the conductive resin layer is disposed exposed on the outer peripheral face of the outer layer hose, since the conductive layer 2 does not come into direct contact with a grounding face or the like, a vibration, an impact, or the like with respect to the conductive layer 2 are reduced and the likelihood of an occurrence of cracks, breakage, peeling and separation, or the like are reduced, the antistatic flexible hose A can be reliably used even in the food and beverage industries, the medical industry, and the like where strict regulations are imposed on contamination by foreign substances.

Furthermore, since the conductive wire 3 is protected by the reinforcing member 4 and does not come into direct contact with a grounding face, products, or the like, breakage, peeling and separation, and the like of the conductive wire 3 are less likely to occur and the antistatic flexible hose A can be reliably used even in the food and beverage industries, the medical industry, and the like where strict regulations are imposed on contamination by foreign substances. Moreover, even when the conductive wire 3 is made of a material susceptible to rust or oxidation such as a metal wire, a conductive thread, or the like, since the conductive wire 3 is protected by the reinforcing member 4 and does not come into direct contact with a fluid or the like, an occurrence of rust, oxidation, or the like can be prevented.

In particular, the conductive wire 3 is preferably formed of a material that is harder than the component material of the hose body 1.

In this case, the conductive wire 3 not only functions as a grounding wire but also functions as a reinforcing material.

Therefore, concomitantly using the hard conductive wire 3 and the reinforcing member 4 enables crush deformation of an entire hose with the bending thereof to be reliably prevented.

As a result, shape retainability of the entire hose can be improved.

In addition, although not illustrated, a reinforcing member (not illustrated) such as a wire can be wound so as to be tightened along a valley that is created between pitches of the spiral reinforcing member 4 and disposed in an exposed state. In this case, the shape retainability of the entire hose can be further improved.

While the "hose connection structure" described in Japanese Patent No. 3690790 has been used as an example of use of the antistatic flexible hose A in the embodiment described above, examples of use of the antistatic flexible hose A are not limited thereto and the antistatic flexible hose A may have other structures as long as static buildup can be removed at an arbitrary location of the antistatic flexible hose A such as using a tightening band with another structure of which an installation location with respect to the antistatic flexible hose A is not specified instead of the grounding member according to Japanese Patent No. 3690790.

REFERENCE SIGNS LIST

A Antistatic flexible hose
1 Hose body
1a Outer peripheral face
2 Conductive layer
2a Outer surface
3 Conductive wire
4 Reinforcing member

The invention claimed is:
1. An antistatic flexible hose, comprising:
a hose body which is formed of a soft material having flexibility;
a conductive layer which is provided along an outer peripheral face of the hose body in an axial direction;
a conductive wire which is wound in a spiral shape along the outer peripheral face of the hose body and an outer surface of the conductive layer and which is provided so as to be pressure-welded, in a radial direction, to the outer peripheral face of the hose body and the outer surface of the conductive layer; and
a reinforcing member which is provided in a spiral shape along the conductive wire so as to protrude from the outer peripheral face of the hose body and the outer surface of the conductive layer, wherein
the reinforcing member is disposed so as to sandwich the conductive wire between the reinforcing member and the outer surface of the conductive layer so that a surface of the conductive wire is crimped to the outer surface of the conductive layer.
2. The antistatic flexible hose according to claim 1, wherein the conductive wire is formed of a material that is harder than a component material of the hose body.

* * * * *